(12) United States Patent
Andersson

(10) Patent No.: US 6,801,217 B2
(45) Date of Patent: Oct. 5, 2004

(54) DETERMINING AND DISPLAYING GEOMETRIC RELATIONSHIP BETWEEN OBJECTS IN A COMPUTER-IMPLEMENTED GRAPHICS SYSTEM

(75) Inventor: Håkan Andersson, Eskilstuna (SE)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/939,815

(22) Filed: Aug. 27, 2001

(65) Prior Publication Data

US 2001/0055031 A1 Dec. 27, 2001

Related U.S. Application Data

(63) Continuation of application No. 09/427,521, filed on Oct. 26, 1999, now Pat. No. 6,281,906, which is a continuation of application No. 08/910,976, filed on Aug. 7, 1997, now Pat. No. 6,046,749.

(30) Foreign Application Priority Data

Aug. 9, 1996 (DE) .......................... 196 32 223

(51) Int. Cl.⁷ .............................. G06T 11/00
(52) U.S. Cl. ........................... 345/648; 345/649
(58) Field of Search ................ 345/619, 419, 345/672, 649, 648, 660, 661, 664, 653, 679, 650, 676

(56) References Cited

U.S. PATENT DOCUMENTS

| | | | | |
|---|---|---|---|---|
| 4,835,528 A | | 5/1989 | Flinchbaugh | |
| 5,396,590 A | * | 3/1995 | Kreegar | 345/648 |
| 5,581,665 A | | 12/1996 | Sugiura et al. | |
| 5,588,098 A | * | 12/1996 | Chen et al. | 345/437 |
| 5,734,805 A | | 3/1998 | Isensee et al. | |
| 5,825,365 A | | 10/1998 | Hirota et al. | |
| 5,861,889 A | * | 1/1999 | Wallace et al. | 345/619 |
| 6,304,855 B1 | * | 10/2001 | Burke | 345/419 |

FOREIGN PATENT DOCUMENTS

| | | |
|---|---|---|
| WO | WO 95/11480 | 4/1995 |
| WO | WO 95/11482 | 4/1995 |

* cited by examiner

Primary Examiner—Matthew Luu
(74) Attorney, Agent, or Firm—Gates & Cooper LLP

(57) ABSTRACT

Method for the modification of three-dimensional objects via an input device allowing only two-dimensional input. The method comprises creating a three-dimensional object, displaying a three-dimensional representation, activating the three-dimensional object, displaying a representation of a three-dimensional coordinate system, selecting one of the axes of the three-dimensional coordinate system assigned to the object, shifting the origin of the assigned coordinate system within a global three-dimensional coordinate system along a line defined by the orientation of the selected axis of the assigned coordinate system within the global three-dimensional coordinate system, computing the three-dimensional object relative to the global coordinate system after shifting according to the displacement of the origin of the assigned coordinate system, and displaying a representation of the shifted three-dimensional object on the computer screen.

33 Claims, 1 Drawing Sheet

DETERMINING AND DISPLAYING GEOMETRIC RELATIONSHIP BETWEEN OBJECTS IN A COMPUTER-IMPLEMENTED GRAPHICS SYSTEM

This application is a continuation of application Ser. No. 09/427,521 filed Oct. 26, 1999, entitled "METHOD FOR THE MODIFICATION OF THREE-DIMENSIONAL OBJECTS", now U.S. Pat. No. 6,281,906, issued on Aug. 28, 2001, which application is a continuation of application Ser. No. 08/910,976 filed on Aug. 7, 1997, now U.S. Pat. No. 6,046,749, issued on Apr. 4, 2000, which application is based on German patent application No. 196 32 223.5, filed Aug. 9, 1996, which application is incorporated herein by reference.

TECHNICAL FIELD

The following invention relates to a method for the modification of a three-dimensional object displayed on a computer screen with the help of an input device.

BACKGROUND OF THE INVENTION

Known graphics programs provide a multitude of possibilities to modify a displayed object. For example, it is possible to move the object to a different location, to rotate the object, or to compress or stretch the object in one or two dimensions.

High-end graphics programs, such as the AutoCAD® application software, are furthermore able to display several views of a given object simultaneously on the screen. These views usually include a three-dimensional view (e.g., isometric view). These graphics programs, however, allow modifications to the object only in the two-dimensional representations. When a change is performed in one two-dimensional view, the corresponding change is calculated for the other two-dimensional views. The user can thus view the effects of a modification that is performed simultaneously in all views, even in the three-dimensional view. These graphics programs, however, do not allow direct modifications to the object shown in the three-dimensional view.

SUMMARY OF THE INVENTION

It is the task of the present invention to provide a method for the direct modification of an object in the three-dimensional view with the help of an input device, preferably a mouse input device allowing only two-dimensional input.

This task is accomplished by a method comprising the following steps:

Creating a three-dimensional object; displaying a three-dimensional representation of the three-dimensional object on a computer screen; activating the three-dimensional object through an operation of the input device relating to the representation of the object; displaying a representation of a three-dimensional coordinate system on the computer screen—with the three-dimensional coordinate system being assigned to the active three-dimensional object; selecting one of the axes of the three-dimensional coordinate system assigned to the object by way of an operation of the input device—with the input operation relating to the representation of the coordinate system displayed on the screen; shifting the origin of the coordinate system assigned to the object within a global three-dimensional coordinate system along a line defined by the orientation of the selected axis of the assigned coordinate system within the global three-dimensional coordinate system, and in a direction which is determined by an operation performed with the input device; computing the three-dimensional object relative to the global coordinate system after moving the object in accordance with the movement of the origin of the assigned coordinate system; and displaying a representation of the shifted three-dimensional object on the computer screen.

According to a preferred embodiment, the displayed object can also be rotated which is achieved by the following additional steps:

Selecting a first axis of the three-dimensional coordinate system assigned to the object through an operation of the input device with the input operation relating to the representation of the assigned coordinate system displayed on the screen; rotating the assigned coordinate system around either the second or third coordinate axis—with the second axis being selected, if a movement of the first axis towards the third axis is induced by means of the input device and whereby the rotation is performed around the third axis, if a movement of the first axis towards the second axis is induced by means of the input device; computing the three-dimensional object relative to the global coordinate system after rotation of the object in accordance with the rotation of the assigned coordinate system; and displaying a representation of the rotated three-dimensional object on the computer screen.

Preferably, the method according to the invention furthermore provides the ability to scale the three-dimensional object, which is achieved by the following steps:

Selecting an axis of the three-dimensional coordinate system assigned to the object through an operation of the input device with the input operation relating to the representation of the assigned coordinate system displayed on the screen; effectuating an extension or stretch operation to the selected axis of the coordinate system assigned to the object by means of the input device; computing the three-dimensional object relative to the global coordinate system after positive or negative stretch of the object along the selected axis of the assigned coordinate system; and displaying a three-dimensional representation of the stretched (or compressed) three-dimensional object on the computer screen.

DETAILED DESCRIPTION OF THE INVENTION

The present invention provides for the modification of an object using a three-dimensional representation of the object. Input operations to control the modification are performed preferably with the help of a mouse input device. As is generally known, a computer mouse can be used to perform click operations as well as shift operations. According to a preferred embodiment, the task of transposing two-dimensional mouse operations onto a three-dimensional object is accomplished by realizing the modification of the displayed object indirectly through a modification of the coordinate system assigned to the object in question. Preferably, the representation of the assigned coordinate system includes discrete modification points, so as to provide a reliable means for detecting the type of modification the user intended to induce through a mouse operation performed. The fact, that the displayed coordinate system includes the above-mentioned modification points at its origin as well as at the endpoints of the three axes displayed, allows the software to determine whether the user intends to perform a modification starting from the origin of the coordinate system or from the endpoints of one of the axes. Clicking on the center of the coordinate system can, for example, be aimed at inducing an operation for shifting the entire coordinate system across the screen. The direction into which the coordinate system is moved must preferably be identical to one of the three main directions determined by the coordinate system. The actual direction of the movement is determined preferably by evaluating a mouse operation performed by the user and comparing the vector of motion derived from this operation to the vectors of the main axes. The modification is then performed along the axis which best matches the vector derived.

A rotation of the coordinate system and therefore of the object as well as of the object's representation is realized preferably by selecting one of the modification points at the endpoints of the axes and afterwards performing a mouse operation pointing towards one of the other two axes. This results in a rotation around the axis which was neither selected nor is parallel to the mouse movement. Similarly, it is also possible to scale the object as well as the representation of the object by scaling the assigned coordinate system. This is again realized preferably by selecting one of the modification points at the endpoints of the axes of the coordinate system and afterwards performing a mouse operation along the same axis. Moving the mouse pointer towards the origin of the coordinate system results in a reduction of the corresponding dimension of the object, whereas moving the mouse pointer away from the origin of the coordinate system results in an extension of the object.

Further preferred embodiments of the present invention are defined by the dependent claims below.

Figure 1:
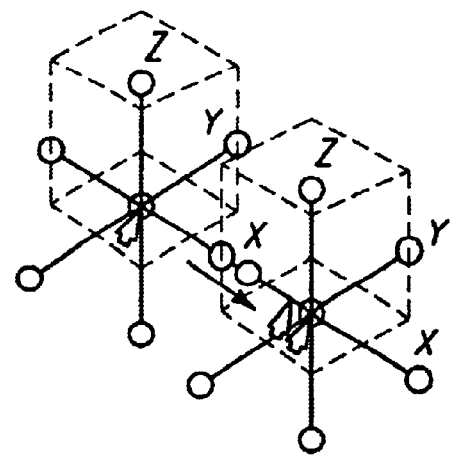
FIG. 1 illustrates the operation to be performed by the user in order to accomplish a displacement of the object marked by the dashed outlines along one of the axes X, Y, Z of the assigned coordinate system.
Figure 2:
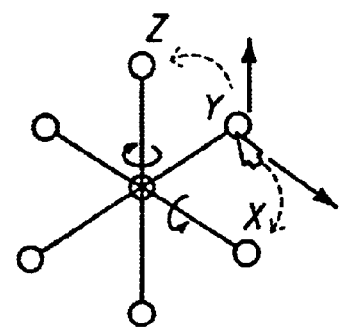
FIG. 2 illustrates in which way a rotation of the coordinate system and thus of the assigned object can be performed.
Figure 3:
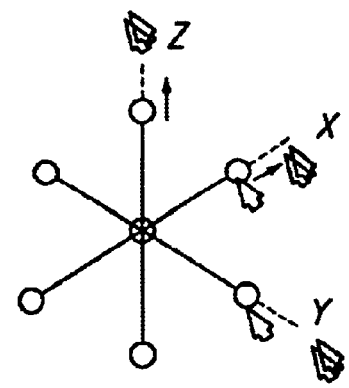
FIG. 3 illustrates in which way the coordinate system and thus the assigned object can be scaled.

In the following, the invention is explained in more detail with reference to the enclosed drawings. FIGS. 1 through 3 contain representations of a coordinate system assigned to a three-dimensional object as well as outlined mouse operations to illustrate the move, rotate and scale modifications of objects.

The present invention is especially suited for use in conjunction with the AutoCAD® graphics application software or similar software programs. These applications include databases providing basic objects such as cylinders, rectangles etc.; the user can retrieve these objects from the database and then apply appropriate modifications to scale them to the desired size and fit them into position. Preferably, in the process of retrieving these basic objects from the database, they are intelligently assigned a coordinate system, which is generally arranged in such a way that its coordinate axes are orthogonal or parallel to the main faces of the respective body.

According to a preferred embodiment, an object retrieved from the database is displayed on the screen in isometric view and after the object has been activated by means of a mouse click, a representation of the coordinate system assigned to the object is displayed. This representation of the coordinate system includes given modification points, which have to be selected before a modification can be performed.

Providing discrete modification points facilitates the translation of a given mouse operation to the desired type of modification. Therefore, the representation of the coordinate system preferably includes a modification symbol at its origin as well as at both endpoints of all three coordinate axes. The coordinate system is preferably displayed at the object's origin, but can also be placed outside the element. Placing the coordinate system outside the object allows in particular rotary movements of the object around an external axis, which is described in more detail below.

FIG. 1 contains a representation of the coordinate system assigned to an object as displayed on the screen. Since the representation must be isometric, the axes of the displayed coordinate system are not perpendicular to each other, as is the case for the actually assigned coordinate system used for computing the modified object. According to the present invention, a modification effected by the user along one of the three axes is detected by tracking the movement performed by the user with the mouse and deriving a vector of motion from this operation. The orientation of the vector is then compared to the orientation of the axes of the isometric representation of the coordinate system on the screen. The operation performed by the user is deemed a movement towards the axis which best matches the vector obtained. Such verification can be realized by projecting the derived vector onto the corresponding axes, as is known to the skilled man.

FIG. 1 illustrates the operation to be performed by the user in order to accomplish a displacement of the object marked by the dashed outlines along one of the axes X, Y, Z of the assigned coordinate system. First, the user selects the spherical modification point in the center of the displayed coordinate system inducing the system to expect a shift operation to follow. As mentioned above, the subsequent mouse operation is being traced in order to obtain a corresponding vector of motion. This vector is then compared to the displayed coordinate axes with regard to its direction, and a displacement is performed in the direction of the axis whose orientation best matches the obtained vector. The extent of the displacement is proportional to the mouse movement performed by the user. The movement of the coordinate system across the screen along a given axis results in a displacement of the coordinate system assigned to the object within a global coordinate system. Based on the relocation of the coordinate system, then the position of the assigned object within the global coordinate system can be determined and the respective object can be saved with these new (absolute) coordinates. Based on the thus computed object, a representation of the object on the screen in isometric view can be derived, so that a representation of the shifted object immediately after moving the representation of the coordinate system across the screen is displayed at the corresponding position on the monitor.

FIG. 2 illustrates in which way a rotation of the coordinate system and thus of the assigned object can be performed. To perform a rotation, for example around the Z-axis, one of the modification points at the ends of the Y-axis is being selected and afterwards a movement along the X-axis is performed. A rotation around the Z-axis can obviously also be realized by activating a modification point on the X-axis and afterwards performing an appropriate mouse operation in the direction of the Y-axis. Similar to the shift operation, the resulting rotation of the object is being calculated on the basis of the rotation of the assigned coordinate system. After computation, a description of the object relative to the global coordinate system is available taking into consideration the rotation performed. Based on these new object data, a representation of the object suitable for display can be computed and displayed on the screen. Thus, a properly rotated representation of the object is displayed almost immediately after conclusion of the rotation of the coordinate system.

FIG. 3 illustrates in which way the coordinate system and thus the assigned object can be scaled. To compress or stretch the object in the direction of the Y-axis, a modification point on the Y-axis is being selected and shifted towards the center of the coordinate system or away from it. The representation of the assigned object is then displayed stretched by an appropriate value in the direction of the Y-axis.

As mentioned above, the position of the assigned coordinate system relative to the corresponding object can preferably be freely determined. This is especially useful, if several objects are combined, because this allows the user to choose a convenient reference point. In particular, the origin of the coordinate system can be placed outside the assigned object to allow a rotation of the object around an external axis. As explained before, initially, the assigned coordinate system will preferably be placed at the origin of the corresponding object. Nevertheless, it can be intelligently assigned right from the start in that the coordinate system is fitted to the main faces of the body in question in the best possible way. Once the user shifts the coordinate system from the originally assigned position, this displacement is preferably stored so that the coordinate system is displayed again at that special position whenever the corresponding object is being activated again.

The corresponding German Patent Application No. 196 32 223.5, filed Aug. 9, 1996,is hereby incorporated by reference.

Although the present invention has been described in terms of preferred embodiments, it is not intended that the invention be limited to these embodiments. Modifications within the scope of the present invention will be apparent. The scope of the present invention is defined by the claims that follow.

What is claimed is:

1. A method for modifying three-dimensional objects, comprising:
   (a) displaying a thee-dimensional representation of a three dimensional object on a display device;
   (b) displaying a representation of a three-dimensional coordinate system on the display device, wherein:
      (i) the three-dimensional coordinate system is assigned to the displayed three-dimensional object;
      (ii) the representation of the assigned coordinate system comprises two or more axes of the assigned coordinate system; and
      (iii) the representation of the assigned coordinate system comprises at least one modification point on one of the axes;
   (c) selecting the modification point;
   (d) receiving an input operation; and
   (e) modifying the representation of the object based on the selected modification point and the input operation.

2. The method of claim 1, wherein the modification point is displayed at the origin of the representation of the coordinate system.

3. The method of claim 1, wherein the modification point is displayed at an endpoint of an axis of the representation of the coordinate system.

4. The method of claim 1, wherein the input operation comprises movement of an input device to reflect a movement along an axis of the coordinate system and the modifying comprises:
   displacing the displayed representation of the coordinate system along the axis; and
   displacing the displayed representation of the object into a new position based on the displacing of the displayed representation of the coordinate system.

5. The method of claim 4, wherein the displacing comprises shifting an origin of the representation of the coordinate system within a global-three dimensional coordinate system along the axis of the representation of the coordinate system, and in a direction of a line that is determined by the movement of the input device.

6. The method of claim 1, wherein the input operation comprises movement of an input device to reflect a movement from a first axis towards a second axis of the represented coordinate system, wherein the modifying comprises:
   rotating the displayed representation of the coordinate system around a third axis; and rotating the displayed representation of the object based on the rotation of the displayed representation of the coordinate system.

7. The method of claim 1, wherein the input operation comprises movement of an input device to reflect a movement along an axis of the represented coordinate system identified by the modification point, wherein the modifying comprises:
   scaling the displayed representation of the coordinate system along the axis; and
   scaling the displayed representation of the object based on the scaling of the displayed representation of the coordinate system.

8. The method of claim 7, wherein the scaling comprises an expansion operation or a compression operation.

9. The method of claim 1, wherein receiving an input operation comprises:
   tracking a movement of the input device;
   deriving a vector of motion from the tracked movement;
   comparing an orientation of the vector to an orientation of axes of the representation of the coordinate system;
   based on the comparison, determining that the input operation is a movement towards an axis that best matches the vector, wherein the modification of the representation of the object is proportional to the movement.

10. The method of claim 1, wherein a position of an origin of the assigned coordinate system can be freely selected relative to the representation of the object.

11. The method of claim 1, wherein modifying the representation of the object comprises:
   modifying the representation of the coordinate system based on the selected modification point and the input operation;
   calculating the modification of the representation of the coordinate system with respect to a global coordinate system; and
   modifying the representation of the object based on the calculating.

12. A system for modifying three-dimensional objects in a computer-implemented drawing program, comprising:
   (a) a computer system having a memory and a display device coupled thereto; and
   (b) a drawing program executing on the computer system, the drawing program configured to:
      (i) display a three-dimensional representation of a three dimensional abject on a display device;

(ii) display a representation of a three-dimensional coordinate system on the display device, wherein:
   (1) the three-dimensional coordinate system is assigned to the displayed three-dimensional object;
   (2) the representation of the assigned coordinate system comprises two or more axes of the assigned coordinate system; and
   (3) the representation of the assigned coordinate system comprises at least one modification point on one of the axes;
(iii) select the modification point;
(iv) receive an input operation; and
(v) modify the representation of the object based on the selected modification point and the input operation.

13. The system of claim 12, wherein the modification point is displayed at the origin of the representation of the coordinate system.

14. The system of claim 12, wherein the modification point is displayed at an endpoint of an axis of the representation of the coordinate system.

15. The system of claim 12, wherein the input operation comprises movement of an input device to reflect a movement along an axis of the coordinate system and the representation of the object is modified by:
   displacing the displayed representation of the coordinate system along the axis; and
   displacing the displayed representation of the object into a new position based on the displacing of the displayed representation of the coordinate system.

16. The system of claim 15, wherein the displacing comprises shifting an origin of the representation of the coordinate system within a global-three dimensional coordinate system along the axis of the representation of the coordinate system, and in a direction of a line that is determined by the movement of the input device.

17. The system of claim 12, wherein the input operation comprises movement of an input device to reflect a movement from a first axis towards a second axis of the represented coordinate system, wherein the representation of the object is modified by:
   rotating the displayed representation of the coordinate system around a third axis; and
   rotating the displayed representation of the object based on the rotation of the displayed representation of the coordinate system.

18. The system of claim 12, wherein the input operation comprises movement of an input device to reflect a movement along an axis of the represented coordinate system identified by the modification point, wherein the representation of the object is modified by:
   scaling the displayed representation of the coordinate system along the axis; and
   scaling the displayed representation of the object based on the scaling of the displayed representation of the coordinate system.

19. The system of claim 18, wherein the scaling comprises an expansion operation or a compression operation.

20. The system of claim 12, wherein an input operation is received by:
   tracking a movement of the input device;
   deriving a vector of motion from the tracked movement;
   comparing an orientation of the vector to an orientation of axes of the representation of the coordinate system;
   based on the comparison, determining that the input operation is a movement towards an axis that best matches the vector, wherein the modification of the representation of the object is proportional to the movement.

21. The system of claim 12, wherein a position of an origin of the assigned coordinate system can be freely selected relative to the representation of the object.

22. The system of claim 12, wherein the representation of the object is modified by:
   modifying the representation of the coordinate system based on the selected modification point and the input operation;
   calculating the modification of the representation of the coordinate system with respect to a global coordinate system; and
   modifying the representation of the object based on the calculating.

23. An article of manufacture comprising a program storage medium readable by a computer and embodying one or more instructions executable by the computer to perform a of modifying three-dimensional objects by means of an input device, the method comprising:
   (a) displaying a three-dimensional representation of a three dimensional object on a display device;
   (b) displaying a representation of a three-dimensional coordinate system on the display device, wherein:
      (i) the three-dimensional coordinate system is assigned to the displayed three-dimensional object;
      (ii) the representation of the assigned coordinate system comprises two or more axes of the assigned coordinate system; and
      (iii) the representation of the assigned coordinate system comprises at least one modification point on one of the axes;
   (c) selecting the modification point;
   (d) receiving an input operation; and
   (e) modifying the representation of the object based on the selected modification point and the input operation.

24. The article of manufacture of claim 27, wherein the modification point is displayed at the origin of the representation of the coordinate system.

25. The article of manufacture of claim 27, wherein the modification point is displayed at an endpoint of an axis of the representation of the coordinate system.

26. The article of manufacture of claim 27, wherein the input operation comprises movement of an input device to reflect a movement along an axis of the coordinate system and the modifying comprises:
   displacing the displayed representation of the coordinate system along the axis; and
   displacing the displayed representation of the object into a new position based on the displacing of the displayed representation of the coordinate system.

27. The article of manufacture of claim 26, wherein the displacing comprises shifting an origin of the representation of the coordinate system within a global-three dimensional coordinate system along the axis of the representation of the coordinate system, and in a direction of a line that is determined by the movement of the input device.

28. The article of manufacture of claim 27, wherein the input operation comprises movement of an input device to reflect a movement from a first axis towards a second axis of the represented coordinate system, wherein the modifying comprises:
   rotating the displayed representation of the coordinate system around a third axis; and rotating the displayed representation of the object based on the rotation of the displayed representation of the coordinate system.

29. The article of manufacture of claim 27, wherein the input operation comprises movement of an input device to reflect a movement along an axis of the represented coordinate system identified by the modification point, wherein the modifying comprises:

scaling the displayed representation of the coordinate system along the axis; and scaling the displayed representation of the object based on the scaling of the displayed representation of the coordinate system.

30. The article of manufacture of claim 29, wherein the scaling comprises an expansion operation or a compression operation.

31. The article of manufacture of claim 27, wherein receiving an input operation comprises:

tracking a movement of the input device;

deriving a vector of motion from the tacked movement;

comparing an orientation of the vector to an orientation of axes of the representation of the coordinate system;

based on the comparison, determining that the input operation is a movement towards an axis that best matches the vector, wherein the modification of the representation of the object is proportional to the movement.

32. The article of manufacture of claim 27, wherein a position of an origin of the assigned coordinate system can be freely selected relative to the representation of the object.

33. The article of manufacture of claim 27, wherein modifying the representation of the object comprises:

modifying the representation of the coordinate system based on the selected modification point and the input operation;

calculating the modification of the representation of the coordinate system with respect to a global coordinate system; and modifying the representation of the object based on the calculating.

* * * * *

UNITED STATES PATENT AND TRADEMARK OFFICE
CERTIFICATE OF CORRECTION

PATENT NO. : 6,801,217 B2  
DATED : October 5, 2004  
INVENTOR(S) : Hakan Andersson Page 1 of 1

It is certified that error appears in the above-identified patent and that said Letters Patent is hereby corrected as shown below:

Column 8,  
Line 20, after "a" insert -- method --.  
Lines 38, 41, 44 and 59, "27" should read -- 23 --.

Column 9,  
Lines 4 and 16, "27" should read -- 23 --.  
Line 19, "tacked" should read -- tracked --.

Column 10,  
Lines 6 and 9, "27" should read --23 --.

Signed and Sealed this

Twenty-second Day of March, 2005

JON W. DUDAS  
*Director of the United States Patent and Trademark Office*